J. VORRABER.
BALL GRINDING MACHINE.
APPLICATION FILED JULY 29, 1916.

1,231,818.

Patented July 3, 1917.
2 SHEETS—SHEET 1.

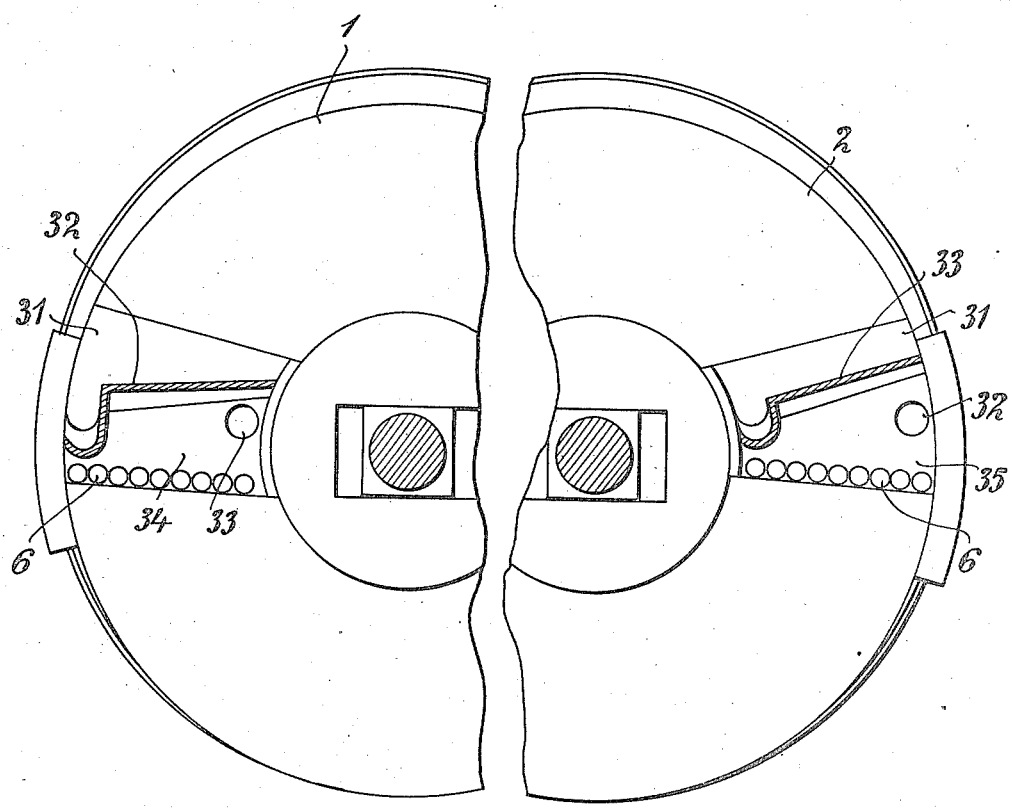

UNITED STATES PATENT OFFICE.

JOSEF VORRABER, OF MUNICH-TRUDERING, GERMANY.

BALL-GRINDING MACHINE.

1,231,818.     Specification of Letters Patent.     Patented July 3, 1917.

Application filed July 29, 1916. Serial No. 112,080.

*To all whom it may concern:*

Be it known that I, JOSEF VORRABER, of 22 Auerfeldstrasse, Munich-Trudering, Bavaria, Germany, civil engineer, have invented certain new and useful Improvements in Ball-Grinding Machines, of which the following is a specification.

My invention relates to ball grinding machines and in particular to that type in which smooth grinders rotate on an eccentric axis in relation to stationary grooved disks which are free to move axially. The object of my invention is to provide means whereby the distance of grooved disks from each other may be maintained constant, notwithstanding the wear of such disks, which permits the feeding and return troughs for the balls to be rigidly secured to a central partition.

An embodiment of my invention is illustrated by way of example in the accompanying drawing in which—

Fig. 3 is a top plan view of the holders with the troughs for the balls and the baffle plates.

Figure 1:
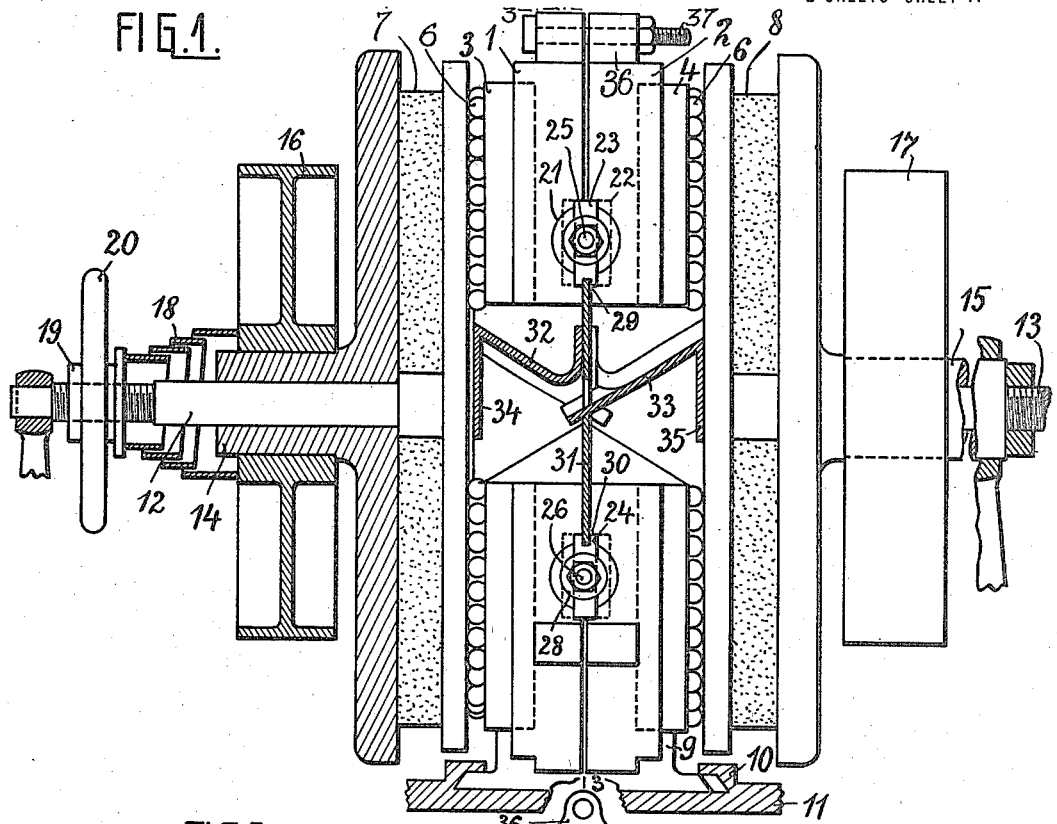
Figure 1 is a front view of the machine, partly in section.
Figure 2:
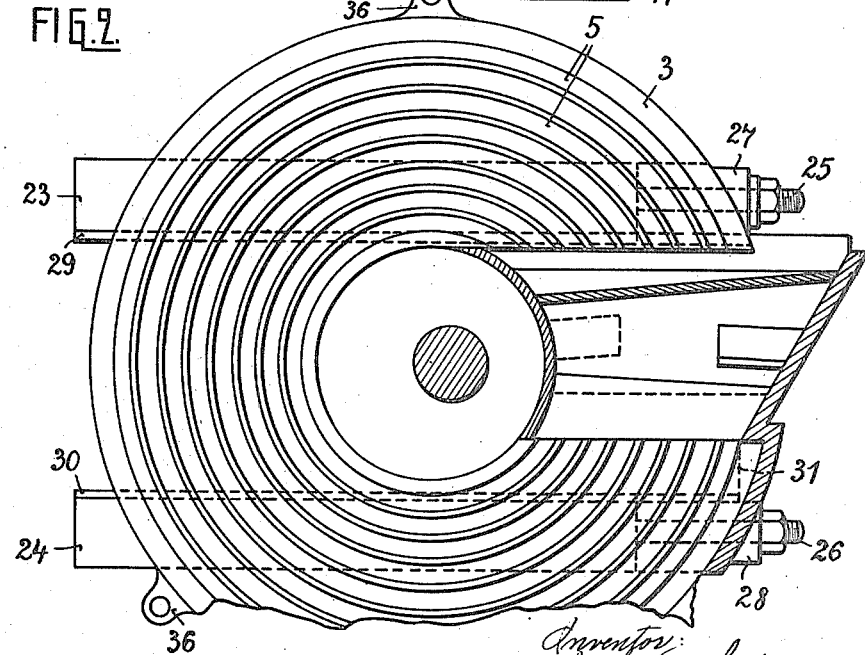
Fig. 2 is a detail view of the grooved disks for the balls and the wedge bolts with the parts for holding them together.

The central stationary part of the machine is formed by two holders 1 and 2 for the grooved disks 3 and 4 in the grooves 5 of which the balls 6 are retained by the grinders 7 and 8. The central part 1, 2 is held on a support 9 which is in a slotted guide 10 formed on the bed-plate 11 of the machine so as to be free to move axially in relation to fixed shafts 12 and 13. Both grinders 7 and 8 have sleeves 14 and 15 which form bearings on the stationary shafts 12 and 13. Motion is imparted to either grinder by a pulley 16 and 17 respectively. Both shafts 12 and 13 are arranged concentrically in relation to the grooved disks 3 and 4, see Fig. 2. One of the grinders, say 8 is held against axial displacement while the other one 7, is mounted to slide on shaft 12 and is forced against the adjacent balls 6 by means of a spring 18, or in any other suitable manner, say by hydraulic pressure. A threaded sleeve 19, with hand-wheel 20, serves to vary the tension of spring 18.

In the rear faces of holders 1 and 2, key slots 21 and 22 are provided. Wedge bolts 23 and 24 coöperate with these slots so as to force holders 1 and 2 apart when the wedge bolts are tightened up by means of screw bolts 25 and 26 passing through washers 27 and 28 respectively, which fit to the circumferences of holders 1 and 2. The wedge bolts 23 and 24 are slotted at 29 and 30 respectively, and in these slots are inserted the edges of a central partition 31 to which the feeding and return troughs 32 and 33 for the balls 6 with their attached baffle plates 34 and 35 are rigidly secured.

The holders 1 and 2 are provided with eyes 36 and set screws 37 in order to keep holders 1 and 2 together.

In operation, the eccentric grinders 7 and 8 are rotated and grind the balls 6 which run in the grooves 5 of disks 3 and 4. During the grinding, pressure is exerted on grinder 7 by its spring 18 which pressure, the holder 1, 2 being free to yield axially, is transmitted to the other grinder 8 so that the balls on either side are held in contact with their respective grinders.

When it is desired to re-adjust the relative distance of these disks to compensate for wear, the wedge bolts 23 and 24 are tightened up by means of screws 25 and 26 until the original distance of the outer faces of disks 3 and 4 have been restored. By these means, the width of holders 1, 2 and the distance between the outer faces of grooved disks 3 and 4 is maintained constant so that no adjustment of troughs 32 and 33 and their baffle plates 34 and 35 is required, and these parts may be rigidly secured to the central partition 31.

I claim:

1. In a ball grinding machine, a stationary holder, grooved disks on said holder, grinders coöperating with said grooved disks, means for feeding balls to and returning balls from said grooved disks, and wedge keys inserted in said holder and adapted to exert axial pressure in opposite directions on the parts of said holder, and means for tightening up said wedge keys.

2. In a ball grinding machine, a stationary holder, grooved disks on said holder, grinders coöperating with said grooved disks, means for feeding balls to and returning balls from said grooved disks, and wedge keys inserted in said holder and adapted to exert axial pressure in opposite directions on the parts of said holder, means for tightening up said wedge keys grooves in said wedge keys and a central partition to which said means for feeding balls to and returning balls from said grooves are secured, said partition being adapted to be received by said grooves.

In testimony whereof, I affix my signature, in presence of two witnesses.

JOSEF VORRABER.

Witnesses:
   Auguste Diehl,
   W. T. Spyking.